UNITED STATES PATENT OFFICE.

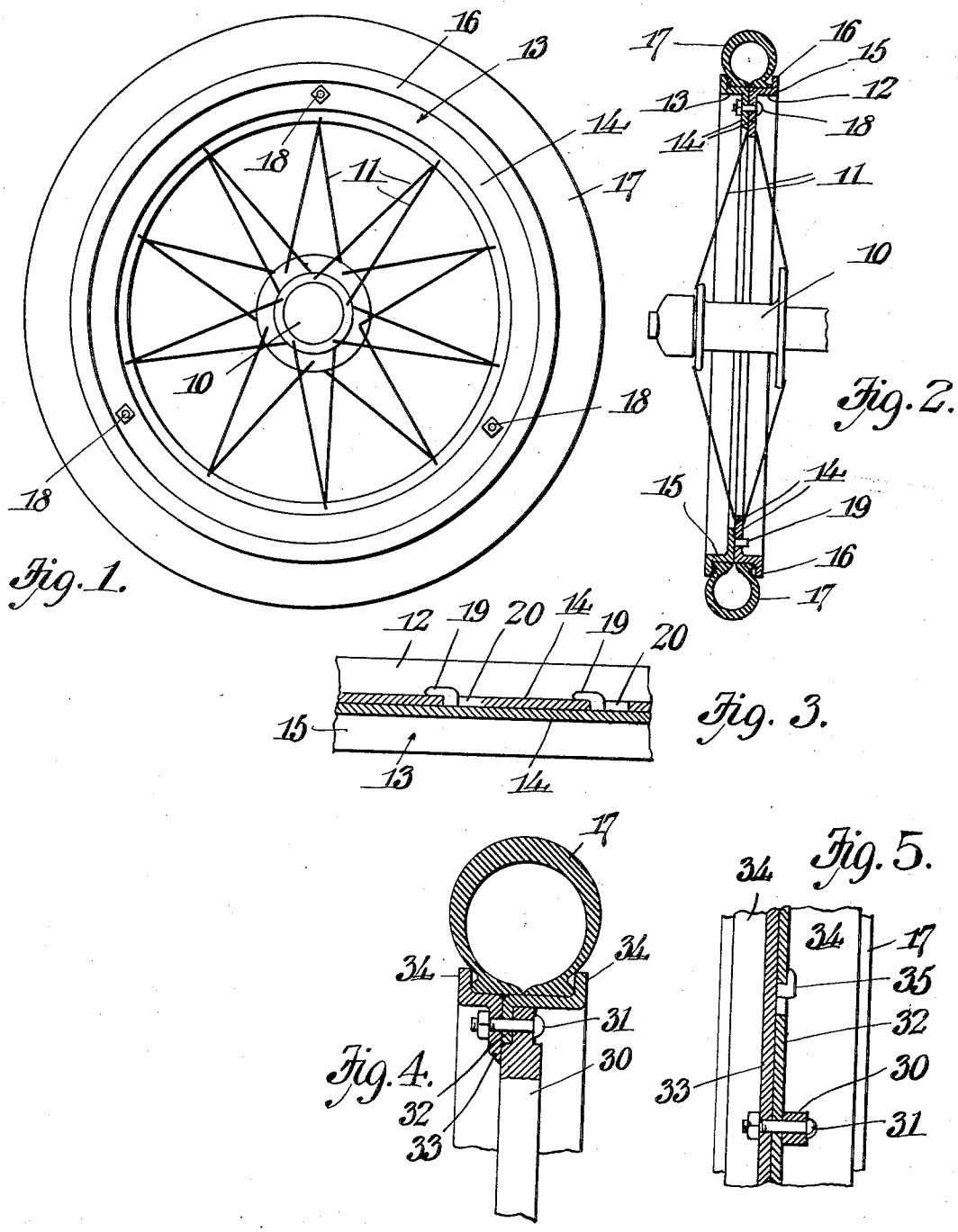

CHARLES A. SNIDER, OF ATLANTA, GEORGIA.

VEHICLE-WHEEL.

1,397,240.     Specification of Letters Patent.     Patented Nov. 15, 1921.

Application filed July 14, 1919. Serial No. 310,594.

*To all whom it may concern:*

Be it known that I, CHARLES A. SNIDER, a citizen of the United States, residing at Atlanta, in the county of Fulton and State of Georgia, have invented new and useful Improvements in Vehicle-Wheels, of which the following is a specification.

This invention relates generally to vehicle wheels, and particularly to wheels for use in connection with motor vehicles and has for an object to provide split or divided rims so constructed as to enable the application of inflatable or solid resilient tires to the wheel to be facilitated.

A further object of the invention is to provide a wheel having a sectional or divided rim, the parts of which may be readily separated when it is desired to remove a tire from the wheel or to apply one thereto, and which, when properly assembled, presents a most rigid and secure structure and one which reduces to a minimum the possibility of the wheel becoming dismembered.

A further and particular object of the invention is to provide a wheel of the character stated which may be constructed and maintained at low cost, which involves in its mechanism no intricate or complicated parts to become disordered, which requires no special skill or tools in applying or removing a tire, and which will prove highly practical and efficient in use.

With these and other objects in view, the invention consists of the features of construction, combination and arrangement of parts hereinafter fully described and claimed, reference being had to the accompanying drawings, in which:—

Figure 1 is a side elevation of a wheel constructed in accordance with the invention, Fig. 2 is a vertical sectional view taken through the wheel, Fig. 3 is an enlarged fragmentary sectional view showing the means employed for securing the rim sections together, Fig. 4 is a sectional view taken through a rim embodying a slight modification, and Fig. 5 is a view illustrating the manner in which the rim sections of the device shown in Fig. 4 are secured together.

Referring now to the drawings and particularly to Figs. 1 to 3 thereof 10 indicates a wheel hub of conventional form and adapted to be secured to the vehicle spindle. The wheel in the present instance is of the wire spoke type, such spokes being indicated at 11.

The rim in this form of the invention comprises what may be termed right and left hand plates or segments, adapted when secured together to form a rim of rigid character for firmly securing the inflatable or cushion tire to the wheel. The rim section 12 is stationary, while the section 13 is removable, and the first named rim has secured thereto the outer ends of the spokes 11. These rim sections are substantially identical in shape and construction, each having a web portion 14, a bearing portion 15 and a flange or bead retaining portion 16. The resilient tire 17 in the present instance is shown as being a pneumatic tire of conventional form.

The wheel will be applied to the spindle so that the rim section 13 will be disposed outwardly so as to be accessible to a mechanic for the removal of the same from the wheel. The web portions 14 of these rim sections lie face to face and each is provided at spaced intervals with openings in registration with each other to receive retaining bolts 18. It is necessary only to employ two or three of such bolts to secure the annular rim sections together as the said sections are provided with coöperating means which assist in firmly securing the sections together and against rotation relative to each other. The outer rim section 13 is provided with a plurality of inwardly projecting hook-shaped members 19 disposed parallel to the said section, and these members engage within slots 20 in the adjacent rim section. The slots 20 are relatively short and are of arcuate shape, and it will be understood that in applying the removable section to the fixed rim section 12, the section 13 will be held so that the hooks carried thereby will extend into the said slots. Slight rotation of the outer section relative to the inner section will then cause these hooks to engage behind the end walls defining the slots 20, and when in such position the bolt receiving openings in the web portions of the rim sections will be in registration with each other. By inserting the bolts through these alined apertures, the rim sections are held against relative rotation, and the hook members and the bolts will coöperate with each other in preventing the said sections becoming separated.

A further modified form of the invention is disclosed in Figs. 4 and 5, and wherein fixed and removable rim sections are applied to wheels having the ordinary solid wooden spokes. In this form of the invention the outer extremities of the wooden spokes 30 are provided with lateral openings, through which retaining bolts 31 extend, and these bolts also project through the web portions 32 and 33 of the removable rim section. Each of these rim sections has a tire retaining portion 34. In this form of the invention, also, the hook and wheel construction described in connection with the preferred form of the invention is employed to hold the web sections of the rim members securely together and against rotation relative to each other. The outer web section has inwardly projecting hook members 35 to engage in apertures formed in the inner web section, and it will be understood that these hook members are engaged behind the end walls of the openings only when the alined openings in the web portions are in registration with each other to receive the retaining bolts 31.

From the foregoing it is obvious that I have provided means of an improved and simplified nature whereby cushion or pneumatic tires may be quickly and easily applied to or removed from the vehicle wheel. Tire holding means of this character may be manipulated without the use of special tools or skill, and the retaining means for holding the fixed and movable sections together have been constructed and arranged with a view to minimizing the opportunity for wear and breakage and to overcome the disadvantage commonly caused by rusting together of the means commonly used for securing the tire to the wheel rim.

Having thus fully described my invention, I claim:—

In a device of the class described, fixed and removable rim sections, webs carried by each of said sections and lying face to face when the sections are assembled, the web of said fixed section having spaced elongated slots therein and also having bolt openings arranged in spaced relation, hooks spaced upon said removable section and spaced apart equal to the distance between said slots, the said hooks adapted to enter said slots and to engage with the edges thereof when the removable section is turned in one direction, the said removable section having its web provided with bolt openings adapted to register with the bolt openings in said fixed section web when the said hooks are engaged with the edges of said slots, and bolts for insertion in the said registered bolt openings.

In testimony whereof I affix my signature.

CHARLES A. SNIDER.